Oct. 29, 1935.  F. RODEGHIER  2,018,743
HYDRAULIC CLUTCH
Filed June 19, 1933   2 Sheets-Sheet 1
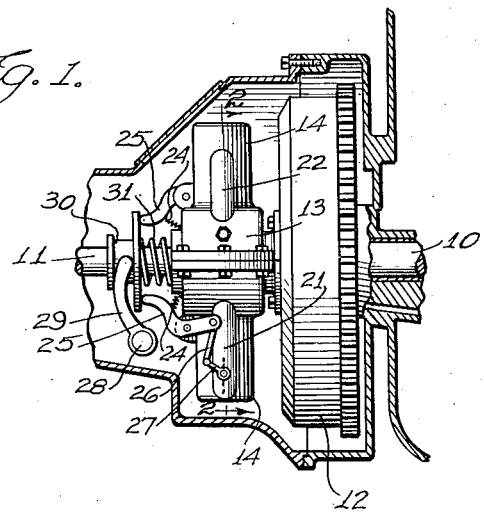
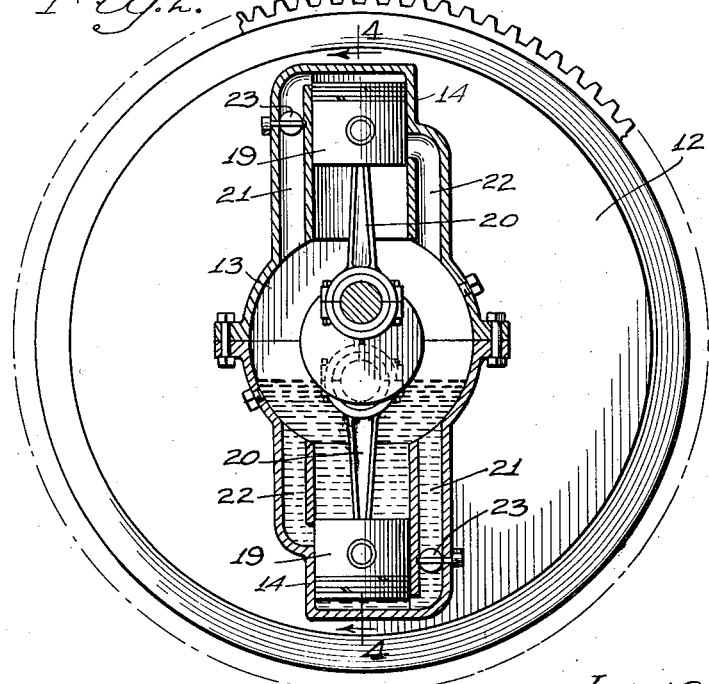

Oct. 29, 1935.　　　F. RODEGHIER　　　2,018,743
HYDRAULIC CLUTCH
Filed June 19, 1933　　　2 Sheets-Sheet 2

Inventor
Frederick Rodeghier,
Witnesses
Fisher, Clapp, Soans & Pond,
Attys:

Patented Oct. 29, 1935

2,018,743

UNITED STATES PATENT OFFICE 2,018,743

HYDRAULIC CLUTCH

Frederick Rodeghier, Joliet, Ill.

Application June 19, 1933, Serial No. 676,520

3 Claims. (Cl. 192—60)

This invention relates to hydraulic clutches of the type designed to connect and disconnect the drive from a power shaft to a driven shaft in endwise alignment therewith, and the main object of the invention is to provide a very simple, inexpensive, rugged and reliable clutch of the hydraulic type.

Another object of the invention is to provide a clutch of the type referred to well adapted to serve the purposes of the ordinary cone or multiple disc clutch at present extensively used in motor vehicle and automobile practice, although it is to be understood that the present invention is by no means limited to automobile clutches but is capable of use advantageously to connect and disconnect endwise aligned drive and driven shafts.

One practical embodiment of the invention is illustrated in the accompanying drawings, in which—

Fig. 1 is a side elevation of my improved clutch, with a suitable casing therefor shown in section.

Fig. 2 is an enlarged vertical section on the line 2—2 of Fig. 1, showing the clutch in non-driving position.

Figure 3:
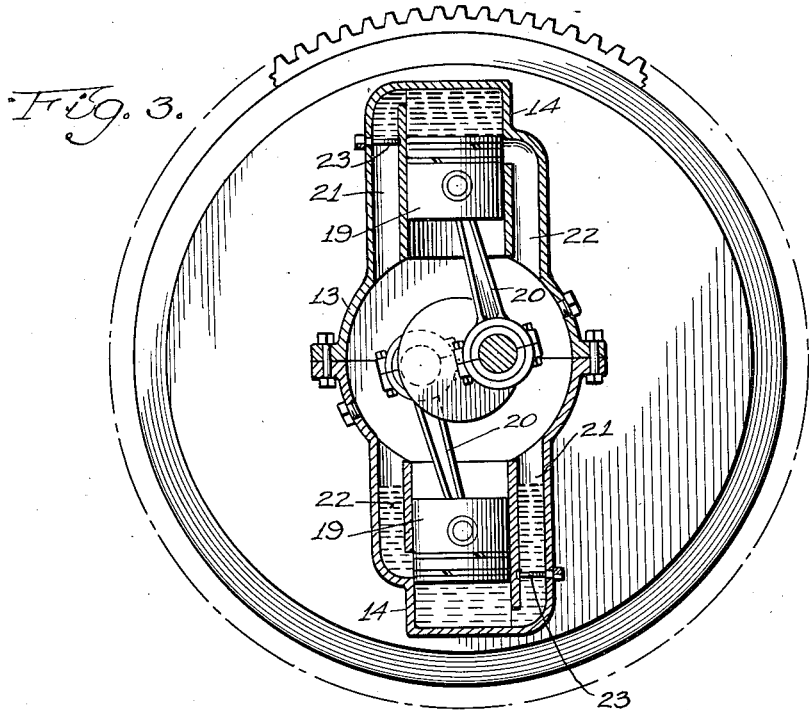
Fig. 3 is a view similar to Fig. 2, showing the clutch in driving position.

Referring to the drawings, 10 designates a drive shaft, such, for example, as the engine shaft of a motor vehicle. 11 designates the driven shaft, such as the propeller shaft of a motor vehicle, disposed in endwise alignment with the drive shaft 10. Fast on the inner end of the drive shaft 10 is a fly wheel, conventionally shown at 12, and rigidly bolted to the face of the fly wheel, in the manner clearly illustrated in Fig. 4, is a crank case 13, integral or rigid with which is a pair of oppositely extending cylinders 14.

Figure 4:
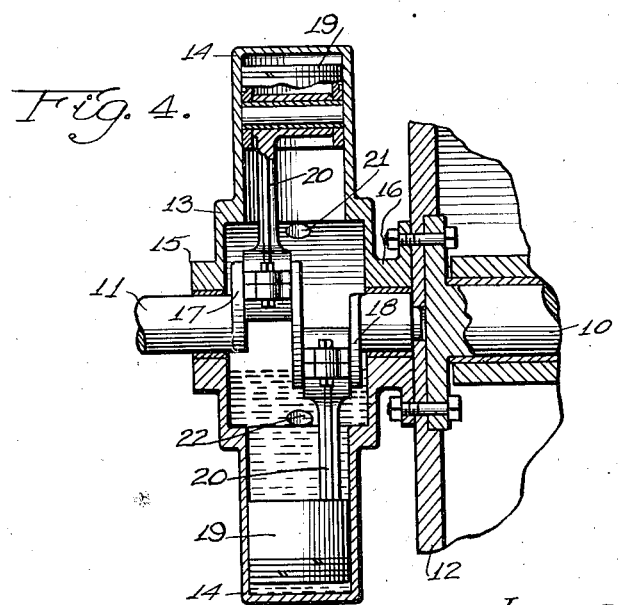
Fig. 4 is a vertical section on the line 4—4 of Fig. 2.

The shaft 11, as shown in Fig. 4, is journaled in suitable hubs 15 and 16 formed on the opposite sides of the crank case 13, and, between said bearings, the shaft 11 is formed with oppositely disposed crank arms 17 and 18. Within the cylinders 14 are plungers 19 that are operatively connected by pitmen 20 to the crank arms 17 and 18. 21 designates each of a pair of flow ducts that, as best shown in Figs. 2 and 3, are formed integral with and extend lengthwise of the cylinders and communicate at their inner ends with the crank case and at their outer ends with the outer ends respectively of the cylinders 14, and 22 designates a pair of what I term filler ducts that also are formed integral with and extend lengthwise of the cylinders 14 and communicate at their inner ends with the crank case and at their outer ends with the cylinders 14 at points intermediate the ends of the latter so that, as shown in Figs. 2 and 3, throughout certain parts of the plunger strokes they are overrun and closed by the plungers.

In each of the flow ducts 21 is a throttle valve 23 designed to open or close the flow passage 21. In Fig. 2 these throttle valves are shown in open position, which corresponds to the non-driving position of the clutch, and in Fig. 3 they are shown in closed position, which corresponds to the driving position of the clutch.

The crank case and cylinders are partially filled with a body of liquid, preferably oil. Under the rapid rotation of the crank case and cylinders, this body of oil is thrown outwardly by centrifugal force, tending to leave the crank case and flood the outer portions of the cylinders. When the motor is started up, the throttle valves 23 are open, as shown in Fig. 2, and so long as the valves remain open, the oil can move freely between the crank case and the outer ends of the plungers, so that the latter are not locked to the cylinders and consequently the resistance of the load merely causes the plungers to reciprocate idly in their cylinders as the crank case and cylinders revolve, and no drive is imparted to the shaft 11.

Now, if the throttle valves 23 be closed, as shown in Fig. 3, while the drive shaft is rotating, the oil is thrown by centrifugal force into the outer ends of the cylinders through the filler ducts 22, and as soon as the plungers return to a position cutting off the filler ducts 22, as shown in Fig. 3, the pistons cannot move outwardly any further, and the cylinders thus become locked through the plungers and pitmen to the cranks of the driven shaft 11, so that the drive is imparted to the latter, and continues so long as the throttle valves remain closed. To disconnect the driving and driven members of the clutch it is necessary only to open the throttle valves, which permits the oil to flow freely between the crank case and the outer ends of the cylinders and thus intermits the clutch drive.

The throttle valves 23 may be operated by any suitable means, but, for motor vehicle equipment, I have in Fig. 1 shown them as normally maintained open by thrust springs 24 acting on the outer arms of a pair of bell crank levers 25 that are pivoted to lugs on the crank case, the inner arms of said levers being connected by links 26 to arms 27 on the throttle valve stems. To close the throttle valves and thus throw the clutch into operation, a pedal-actuated rock shaft 28 is provided with a fork 29 engaged with a grooved collar 30 slidable on the driven shaft 11, the inner side of the collar 30 abutting against the levers 25 so as to rock the latter to valve closing position when the collar 30 is forced inwardly. When the rock shaft pedal is released, the collar 30 is thrust outwardly by a spring 31, which permits the springs 24 to open the throttle valves.

It will be observed that in the construction shown and described the cylinders and plungers are diametrically opposed relatively to the axis of rotation, the crank shafts are also opposed and of equal throw, and the pitmen are of equal length. Hence, in all positions of the plungers the structure is balanced, and, at the high speeds of rotation to which the clutch is subjected in use, sets up no lateral thrust on the shafts and their bearings. This is of large practical importance, since it is well known by engineers that a few ounces of unbalance in a rotary structure is, at high speeds, multiplied by centrifugal force to many pounds of lateral thrust, causing severe wear on the shaft bearings.

I have herein shown and described one practical and serviceable embodiment of the principle of the invention, but manifestly structural variations and modifications may be resorted to without departing from the substance of the invention as defined in the claims.

I claim:

1. In a hydraulic clutch, the combination of a drive shaft, a driven shaft aligned with said drive shaft, a pair of oppositely disposed cranks of equal length on said driven shaft, a crank case and a pair of external oppositely disposed radial cylinders fast with, and bodily rotatable around the axis of, said drive shaft, plungers in said cylinders, pitmen of equal length connecting said plungers and cranks, a body of liquid in said crank case, flow ducts for said liquid extending lengthwise of said cylinders and communicating respectively with said crank case and the outer ends of said cylinders, throttle valves in said ducts, and filler flow ducts extending lengthwise of said cylinders and communicating respectively at one end with said crank case and at their other ends with said cylinders at points between the inner and outer ends of the latter.

2. In a hydraulic clutch, the combination of a drive shaft, a fly wheel fast on said drive shaft, a driven shaft aligned with said drive shaft opposite said fly wheel, a pair of oppositely disposed cranks of equal length on said driven shaft, a crank case secured to the face of said fly wheel, a pair of external oppositely disposed radial cylinders rigid with said crank case, plungers in said cylinders, pitmen of equal length connecting said plungers and cranks, a body of oil in said crank case, flow ducts for said oil extending lengthwise of said cylinders and communicating respectively with said crank case and the outer ends of said cylinders, throttle valves in said ducts, and filler flow ducts extending lengthwise of said cylinders and communicating respectively at one end with said crank case and at their other ends with said cylinders at points between the inner and outer ends of the latter.

3. In a hydraulic clutch, the combination of a drive shaft, a driven shaft aligned with said drive shaft, a pair of oppositely disposed cranks of equal throw on one of said shafts, a crank case and a pair of external oppositely disposed radial cylinders fast with, and bodily rotatable around the axis of, the other shaft, plungers in said cylinders, pitmen of equal length connecting said plungers and cranks, a body of oil in said crank case, flow ducts for said oil integral with and extending lengthwise of said cylinders and communicating respectively with said crank case and the outer ends of said cylinders, throttle valves in said ducts, filler flow ducts integral with and extending lengthwise of said cylinders and communicating respectively at one end with said crank case and at their other ends with said cylinders at points between the inner and outer ends of the latter, spring actuated means normally maintaining said throttle valves open, and manually operable means for closing said throttle valves against the urge of said spring actuated means.

FREDERICK RODEGHIER.